US009542288B2

(12) United States Patent
Huang et al.

(10) Patent No.: US 9,542,288 B2
(45) Date of Patent: *Jan. 10, 2017

(54) DIAGNOSIS FOR A SERVER MOTHERBOARD

(71) Applicant: LENOVO ENTERPRISE SOLUTIONS (SINGAPORE) PTE. LTD., New Tech Park (SG)

(72) Inventors: He Huang, Shanghai (CN); Mehul Shah, Austin, TX (US); Adam L. Soderlund, Bahama, NC (US); Wen Wei Tang, Shanghai (CN); Yun Le Wang, Shanghai (CN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 192 days.

This patent is subject to a terminal disclaimer.

(21) Appl. No.: 14/488,834

(22) Filed: Sep. 17, 2014

(65) Prior Publication Data
US 2015/0095713 A1  Apr. 2, 2015

(30) Foreign Application Priority Data
Sep. 27, 2013 (CN) .......................... 2013 1 0452622

(51) Int. Cl.
*G06F 11/00* (2006.01)
*G06F 11/22* (2006.01)
(Continued)

(52) U.S. Cl.
CPC ........... *G06F 11/2284* (2013.01); *G06F 1/266* (2013.01); *G06F 11/221* (2013.01); *G06F 11/26* (2013.01)

(58) Field of Classification Search
CPC ..... G06F 11/2284; G06F 11/221; G06F 11/26; G06F 1/266; G06F 13/4081
See application file for complete search history.

(56) References Cited

U.S. PATENT DOCUMENTS

| 7,849,454 B2 | 12/2010 | Lambert et al. |
| 7,975,084 B1 | 7/2011 | Kalbarga |
| (Continued) | | |

FOREIGN PATENT DOCUMENTS

KR          20100050380          5/2010

OTHER PUBLICATIONS

International Business Machines Corporation, "List of IBM Patents or Patent Applications Treated as Related" Oct. 12, 2014, 2 pages.
(Continued)

*Primary Examiner* — Philip Guyton
(74) *Attorney, Agent, or Firm* — Katherine Brown

(57) ABSTRACT

A server motherboard diagnosis method, system, and related circuit system. A management module of the server motherboard and peripheral devices managed by the management module are capable of being powered by a server power source and a USB port. In response to the management module and the peripheral devices being powered by the USB port, a power supply line of the server power source is isolated, as by: identifying the peripheral devices, in response to the management module and the peripheral devices being powered by the USB port; for each of the identified peripheral devices, initializing the peripheral device, and then shutting down the power supply of the peripheral device; establishing a communication between the management module and a diagnosis host through the USB port; and executing a command in response to the command being received from the diagnosis host.

13 Claims, 5 Drawing Sheets

(51) Int. Cl.
   G06F 1/26    (2006.01)
   G06F 11/26   (2006.01)

(56) References Cited

U.S. PATENT DOCUMENTS

| | | |
|---|---|---|
| 8,214,653 B1 | 7/2012 | Marr et al. |
| 8,230,210 B1 | 7/2012 | Polyudov |
| 2007/0219748 A1* | 9/2007 | Iwasa .................. G06F 11/0745 702/182 |
| 2012/0084552 A1 | 4/2012 | Sakthikumar et al. |
| 2012/0110378 A1 | 5/2012 | Fan et al. |
| 2013/0007430 A1 | 1/2013 | Fan |
| 2015/0095713 A1* | 4/2015 | Huang .................... G06F 11/26 714/43 |
| 2015/0095714 A1* | 4/2015 | Huang .................... G06F 11/26 714/43 |

OTHER PUBLICATIONS

"A Method and System That Updates All System Firmware Out-Of-Bands", <http://ip.com/IPCOM/000223362>, Nov. 20, 2012, 8 pages.

"A Method of Automatic Recovering Server Firmware", <http://ip.com/IPCOM/000222143>, Sep. 20, 2012, 7 pages.

"System Management Firmware Modularization", <http://ip.com/IPCOM/000188509>, Oct. 12, 2009, 3 pages.

* cited by examiner

DIAGNOSIS FOR A SERVER MOTHERBOARD

TECHNICAL FIELD

The present invention relates to a server, and particularly to a method, system and relevant circuit system for diagnosis of a server motherboard.

BACKGROUND

Generally, a server is powered by a power source of the server. A management module of the server is responsible for the management function. For accomplishing the management function of the server, such as hardware upgrade or log collection, the management module of the server needs to be initialized to some status with the use of the power source of the server. The entire procedure of the initializing to some status includes complicated user operations, such as configuring a web connection and user authentication, all of which need the cooperation of a power module.

When there is a problem of the server, generally, a maintenance staff will replace the server motherboard with a new motherboard, and bring the original motherboard back to a lab for diagnosis, so as to find the problem. The power source configured for the lab is essentially the same as the power source of the power module configured for the server. In doing so, however, it is time-consuming. The maintenance staff usually wishes to diagnose in the field, in order to determine if the server motherboard is problematic.

It is necessary to conduct a series of installations and configurations to collect logs or update/recover hardware, so as to diagnose a piece of problematic server motherboard to locate problems. When there is a problem with the server in the field, the power source of the server might not be able to supply power; usually, there is no spare power source of the server in the field, and it is very inconvenient for maintenance staff to carry a spare power source of the server with them. Some problems of the server may also cause firmware of the management module to not work properly, and the maintenance staff cannot diagnose the problems with the managing functions provided by the firmware of the management module.

SUMMARY

According to one aspect of the present invention, there is provided a server motherboard diagnosis method, there being a management module of the server motherboard and peripheral devices managed by the management module capable of being powered by a server power source and a USB port, wherein in response to the management module of the server motherboard and the peripheral devices managed by the management module being powered by the USB port, a power supply line of the server power source is isolated, the method including:

identifying the peripheral devices managed by the management module in response to the management module of the server motherboard and the peripheral devices managed by the management module being powered by the USB port;

for each of the identified peripheral devices managed by the management module, initializing the peripheral device, and then shutting down the power supply of the peripheral device;

establishing a communication between the management module and a diagnosis host through the USB port; and executing a command in response to the command being received from the diagnosis host.

According to another aspect of the present invention, there is provided a system for diagnosis of a server motherboard, there being a management module of the server motherboard and peripheral devices managed by the management module capable of being powered by a server power source and a USB port, wherein in response to the management module of the server motherboard and the peripheral devices managed by the management module being powered by the USB port, a power supply line of the server power source is isolated, the system comprising:

an identifying module, configured to identify the peripheral devices managed by the management module in response to the management module of the server motherboard and the peripheral devices managed by the management module being powered by the USB port;

an initializing module configured to, for each of the identified peripheral devices managed by the management module, initializing the peripheral device, and then shutting down the power supply of the peripheral device;

a communication establishing module, configured to establish a communication between the management module and the diagnosis host through the USB port;

a command executing module, configured to execute a command in response to the command being received from the diagnosis host.

According to yet another aspect of the present invention, there is disclosed a power source selection and isolation system, for selecting and isolating a power source in the case of a management module of a server and peripheral devices managed by the management module being powered by a server power source and a USB port, the system comprising:

a management module power source selection and isolation module, configured to take the output of the server power source and the output of the power supply connected to the USB port as its input signal, in response to the output of the server power source having a voltage, take the output of the server power source as its output to the power supply input of the management module, and in response to only the output of the power supply connected to the USB port having a voltage, take the output of the power supply connected to the USB port as its output to the power supply input of the management module, and output a notification signal about source of the power supply for indicating which power supply the power supply input of the management module should use;

a management module, configured to: receive a power supply input of the management module and a notification signal about the source of the power supply output from the management module power source selection and isolation module, output a control signal of the power supply connected to a USB port of a peripheral device of the management module, for controlling the peripheral device to take power or not;

a peripheral device power source selection and isolation module, configured to: take the output of the server power source, the output of the power supply connected to the USB port, and the control signal of the power supply connected to the USB port of the peripheral device output by the management module as its input, in response to only the output of the server power source having a voltage or both the output of the server power source and the output of the power supply connected to the USB port having voltages, take the output of the server power source as its output to the power supply input of the peripheral device managed by the management module, and in response to only the output of the power supply connected to the USB port having a voltage, take the output of the power supply connected to the USB port as its output to the power supply input of the peripheral device managed by the management module, and control the peripheral device to take power or not according to the control signal of the power supply connected to the USB port of the peripheral device of the management module.

With the above method and system according to the present invention, it is possible to accelerate the diagnose progress of a motherboard.

BRIEF DESCRIPTION OF THE DRAWINGS

Through the more detailed description of example embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Figure 1:
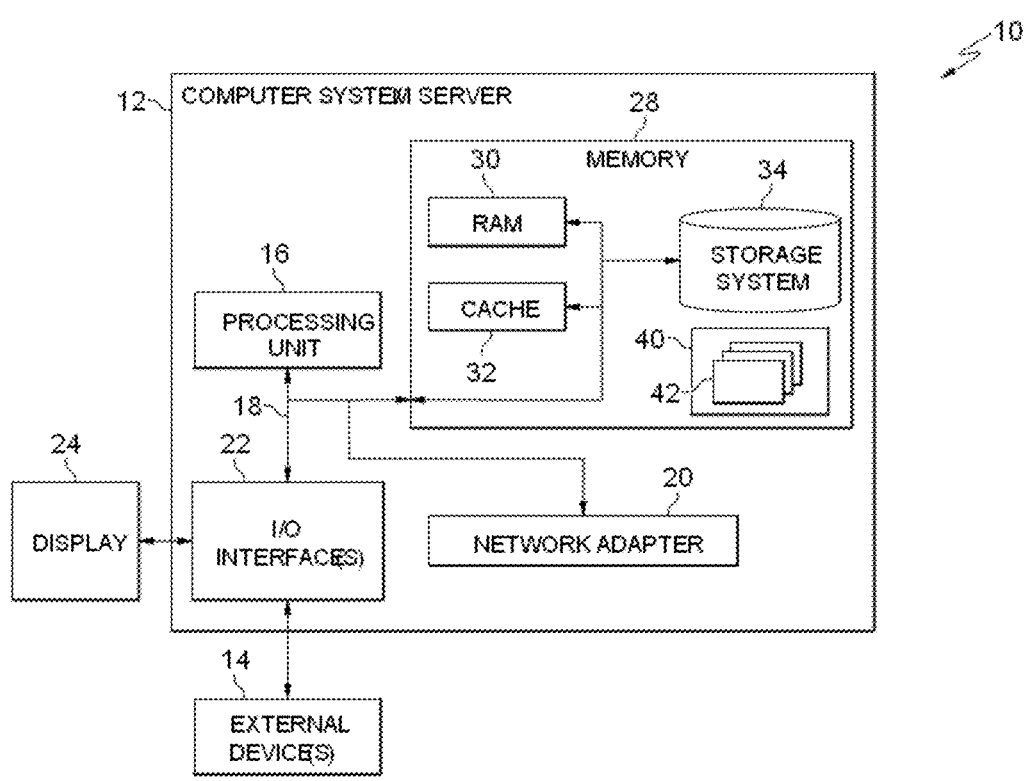
FIG. 1 illustrates a block diagram of an exemplary computer system/server suitable for implementing an embodiment of the present invention.

Example embodiments will be described in more detail with reference to the accompanying drawings, in which the example embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an example computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereafter, the embodiments of the present invention will be described with reference to the figures.

In order to diagnose the motherboard of a server, a maintenance staff in the field usually carries a laptop computer with him/her, wishing to diagnose the problem of the motherboard in a short time. Therefore, a feature of the present invention is to power the motherboard of a server with a USB port of the laptop or any other USB power supplying device, and finish the diagnosis of the motherboard.

During a field diagnosis, the main task the maintenance staff needs to perform is to start up a management module of the motherboard. The operating system and the application on the server will not be started up. The management module contains a dedicated management chip on the motherboard, and peripheral devices. The peripheral devices of the management module include at least one of: RAM, Serial Peripheral Interface (SPI interface), network card (Ethernet), I2C device, PCI device, Serial Communication Interface (SCIF), MMC (Multi-Media Card) device, NAND storage device, and the like. Here, firmware should be running in the memory after the start up of the management module. The SPI interface is used to mount a server firmware storage device (UEFI flash) and a firmware bootloader storage device (bootloader flash). The network card is used to manage a network module of the management module. The management module may mount many I2C devices by I2C interfaces. The management module is in an I2C master mode, while the other peripheral devices are in a slave mode. For example, FPGA/RTMM (real-time management module) is an I2C device. The PCI device is a device which supports the PCI protocol. The SCIF device is a peripheral device which supports serial communication protocol, including Bluetooth, RS232 and RS485 device. The MMC device is a memory similar to a hard drive, which stores the firmware of the management module. The NAND storage device is a flash storage device, which can store the firmware of the management module.

A rack server consumes several hundreds watts of power minimally, usually no more than 500 watts. And usually the operating power of the management module and its peripheral devices will not exceed 5 watts. In the present invention, features of the management module (chip+peripheral circuits) include, for example, a Service Processor and Baseboard Management Controller BMC, and selectively enabling the peripheral devices of the management module to execute server management tasks. The server management tasks include hardware update/restore, memory content acquisition, server log collection and the like. Thus, the power source of the provided USB connection only needs to provide a power which fulfills the needs for above-mentioned tasks.

In the present invention, the startup process of the management module starts from the chip to the peripheral devices. When the chip is being started up, input voltage is 1.5V, and the maximum operating power is limited within 1 W. During the start up of the management module, power consumption and the peripheral devices are under control. Therefore the power for finishing management module hardware updates, memory content acquisition, log collection and the like is about 3 W. Taking the voltage that the USB ports supply being 5V and the current being 500 mA or 1 A into consideration, and assuming that the output current is 1 A, the output power is 5 W. Apparently, the power supply of the USB port is sufficient to meet the demand of all the work for diagnosing the management module in the field. However, the precaution to do such is that the power supply of the server power source is isolated, otherwise, the power supply line of the server power source will generate leakage current, so that it is not certain if the power supply of the USB port could meet the demand of all work during the diagnosis by the management module in the field or not.

Figure 2:
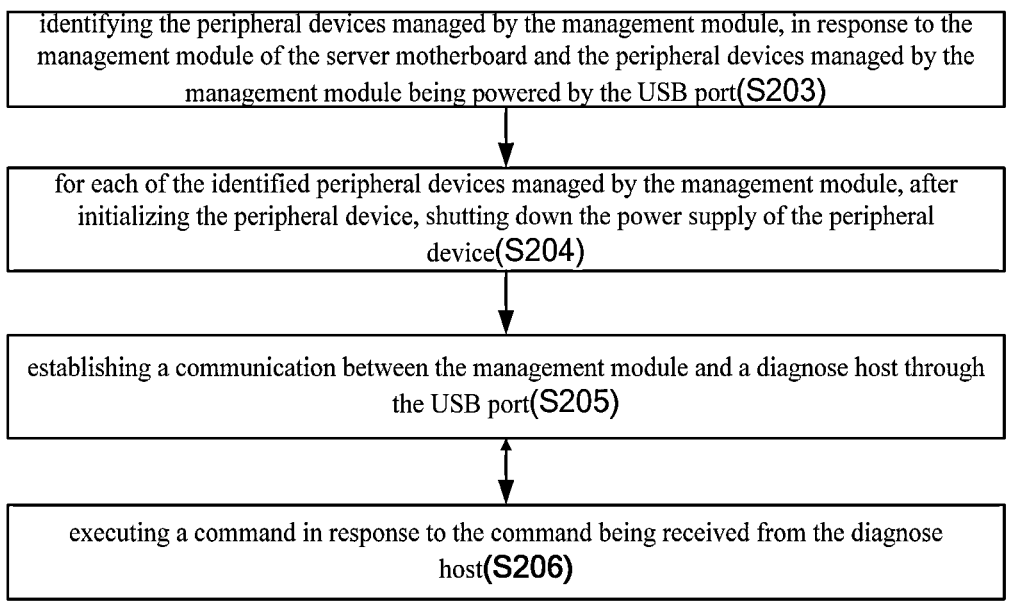
FIG. 2 illustrates a flow chart of a method for diagnose of a server motherboard, according to one embodiment of the present invention.

One aspect of the present invention comprises a server motherboard diagnosis method. The management module and the peripheral devices managed by the module in the motherboard of the server can be powered by the server power source or a USB port, wherein the server power source is isolated in response to the management module of the server motherboard and the peripheral devices managed by the management module being powered by a USB port. FIG. 2 illustrates a flow chart of steps of an example server motherboard diagnosis method, according to one embodiment of the present invention. According to FIG. 2, the method includes the following steps.

In identifying step S203, the peripheral devices managed by the management module are identified in response to the management module of the server motherboard and the peripheral devices managed by the management module being powered by the USB port;

In initializing step S204, for each of the identified peripheral devices managed by the management module, the peripheral device is initialized and then the power supply of the peripheral device is shut down.

In communication establishing step S205, a communication between the management module and a diagnosis host is established through the USB port;

In command executing step S206, a command is executed in response to the command being received from the diagnosis host.

Steps S203, S204, and S205 all can be executed by a firmware bootloader of the management module. The firmware bootloader of the management module is firmware of the management module chip, and it is an on-chip device, which can be located inside the chip or outside the chip. Upon the management module being powered on, the firmware starts to run. Those skilled in the art will appreciate from the present disclosure that these steps can be executed by other components with the developing of technology in the future.

For step S203 of FIG. 2, there are many implementation alternatives for identifying the peripheral devices of the management module with the use of the firmware bootloader of the management module. In the case of being powered by a server power source, there is also a need for identifying peripheral devices to be loaded. Identifying the peripheral devices with the use of the firmware bootloader is prior art. The only difference from the prior art lies in that, a management control should be conducted for the power supply of the peripheral devices in the case of being powered by the USB port, and the management control is not necessary in the case of being powered by the server power source. In one embodiment, it is possible to identify the peripheral devices of the management module with the firmware bootloader loading of the management module, and the firmware bootloader loading includes two load modes: loading on start up by scanning a device, and loading on start up by the information stored or set in advance.

In the mode of loading on start up by way of scanning a device, when the firmware bootloader is being started up, it has no knowledge of which peripheral devices should be identified and loaded. It has to scan each interface for peripheral devices to obtain basic information of related devices, and load and initialize them one by one. In this implementation, start up can be done without considering peripheral devices, and the related devices can be identified intelligently by scanning. However, since the bootloader has to scan each interface one by one, it takes a long time. And at the same time, there may be a problem of the bootloader not being capable of identifying related devices due to a mismatch between the peripheral devices and the management module.

In the mode of loading on start up through information stored or set in advance, when the firmware bootloader is being started up, it reads parameter information of the peripheral devices in a configuration file and loads and initializes devices according to the information. In this mode, the bootloader is quick to start up, and all the peripheral devices can be loaded on start up because of knowing related setting parameters in advance. However, since the configuration information is solidified in the firmware bootloader, the configuration can not be altered flexibly.

In another embodiment of step S203 of FIG. 2, the firmware bootloader of the management module identifying the peripheral devices managed by the management module can do so by identifying and loading peripheral devices by way of a hardware circuit. Normally, identifying and loading peripheral devices by way of hardware manner requires that there be a hardware logic circuit support in the peripheral devices and the chip of the management module. The communication and information delivery between the two is implemented by GPIO or related protocols, realizing the identification of peripheral devices by the chip of the management module. This mode is fast, and all peripheral devices are solidified and verified in advance, therefore, they can all be identified. However, since hardware is solidified, it can not be altered.

For step S204 of FIG. 2, initializing the peripheral devices managed by the management module by means of the firmware of the management module is prior art, and has been used for the existing power supply of the server power source. Therefore, the description is omitted. Initializing the peripheral devices managed by the management module by means of other devices in the future can utilize similar methods. In the case of power supply by the server power source there is no need to limit usage of the power source. Thus, the power source can remain in the status of normal power supply before or after the initialization of each peripheral device. And, several peripheral devices might be initialized serially (that is, peripheral devices being initialized one by one sequentially) or in parallel (that is, peripheral devices being initialized at the same time). But, in the present invention with power supply from a USB port, after one identified peripheral devices is initialized, in order to control the usage of power, the power supply of this peripheral device has to be shut down immediately after the initialization and then initialization of the next identified peripheral device will be conducted. That is, these peripheral devices should be initialized one by one in serial, preventing problems from insufficient power of initializing several peripheral devices at the same time.

For step S205 of FIG. 2, establishing communication between the management module and a diagnosis host through a USB port with the use of the firmware bootloader of the management module is handled by taking the USB port as the communication port between the management module of the motherboard and the diagnosis host. Taking a USB port as a communication port is prior art. Establishing communication between the management module and the diagnosis host through the USB port by means of other devices in the future may use similar methods, and description thereof is omitted.

In the step S206 of FIG. 2, in the step of executing a command in response to receiving the command from the diagnosis host, it may be understood that the commands are all related to the peripheral devices of the management module. The commands received from the diagnosis host are classified into two categories depending on different peripheral devices, in one category are commands related to a firmware of the management module, i.e., the peripheral devices comprise a memory in which the management module resides; in the other category are commands related to other peripheral devices of the management module, the other peripheral devices being not the memory in which the management module resides.

The firmware bootloader of the management module is similar to the firmware BIOS of a computer. The BIOS is started up as soon as it is powered on. The firmware of the management module is similar to the operating system of a computer. In the case of the existing power supply by the server power source, after the initialization of the firmware bootloader, the firmware of the management module may be started up, enabling the management module to perform management functions. The firmware of the management module normally is stored in a local flash device of the management module. Only if the firmware of the management module is loaded by the firmware bootloader, will the firmware of the management module operate. In commands related to the firmware of the management module, one is a command sent by the diagnosis host to start up the firmware of the management module, and this is prior art, and the command is also needed during the diagnosis of power supplying the server. After the firmware bootloader of the management module has established communication between the management module and the diagnosis host, once a command to start up the firmware of the management module is received, it is possible to turn on the local flash device to read the firmware of the management module and start it. In a flash start mode, the firmware of the management module is stored in the MMC or NAND storage device. After the firmware bootloader has initialized and loaded the MMC or NAND storage device, the MMC or NAND storage device is equivalent to a hard disk. The management module can read files and corresponding programs in the storage device.

Another command related to the firmware of the management module is a command for updating the firmware of the management module. If the diagnosis host regards that the firmware of management module read from the local flash device has expired or has a problem, an update command can be received, that is, a mirror file of a firmware of the management module is load from the diagnosis host via the USB port, and started up. In the way of firmware updating, the firmware bootloader initializes the network card device or sets up a network passage simulated by the USB, and after the establishment of connection with the diagnosis host, it is possible to load a mirror file on a remote network host. The way of loading the mirror is not limited within ways of network loading such as NTFS/PXE. The mirror file of this implementation is stored in the host, and it is possible to replace the mirror file.

Commands related to the other peripheral devices of the management module include a command about obtaining an event log, a command about turning on a peripheral device, and the like. In response to receiving a command related to the other peripheral devices of the management module, which are not the memory where the firmware of the management module resides, it is possible to execute in two ways.

In one way, after the firmware bootloader loads the firmware of the management module, the firmware bootloader only controls the power supply of the peripheral devices managed by the management module, and transfers other control to the firmware of the management module. In response to receiving a command related to a peripheral device managed by the management module via a USB port, the firmware of the management module instructs the firmware bootloader to turn on the power supply of a peripheral device corresponding to the command, and the command is sent to the peripheral device by the firmware. In response to the completion of the execution of the command, the firmware instructs the firmware bootloader to shut down the power supply of the peripheral device corresponding to the command. Then, the firmware of the management module returns the result of the execution of the command back to the diagnosis host via the USB port.

In the other way, after the firmware bootloader loads the firmware of the management module, the firmware bootloader transfers the control to the management module and exits. In response to receiving a command related to a peripheral device managed by the management module via a USB port, the firmware of the management module turns on the power supply of the peripheral device corresponding to the command, and sends the command to the peripheral device. In response to the completion of the execution of the command, the firmware shuts down the power supply of the peripheral device corresponding to the command. Then, the result of the execution of the command is returned back to the diagnosis host via the USB port.

In the above various embodiments, turning on the power supply of the peripheral device includes conducting enabling configuration of the peripheral device, so as to enable the peripheral device to operate.

In one embodiment, the server motherboard diagnosis method includes a step (not shown in FIG. 2) of determining the management module in the motherboard of the server and the peripheral devices managed by the management module are powered by the server power source or by the USB port. Besides using the USB port to supply power to the management module and the corresponding peripheral devices for diagnose, the server motherboard still needs to power the management module and the corresponding peripheral devices with the use of the power source of the server during normal operation. Thus, the server motherboard has two sets of power supply circuits. And when the USB port is supplying power, it has to isolate the power supply line of the server power source. While the server power source is supplying power, it may not isolate the USB ports from supplying power, since the limitation on the electricity amount of the server power source is less strict. Of course, a better design is to isolate the two of the power supply lines from each other, so that it prevents a problem of the current flowing to the USB port of the diagnosis host being too much, which might cause the USB port of the diagnosis host to be unstable, and so on.

In one embodiment, the server motherboard diagnosis method of FIG. 2 further includes a step (not shown in FIG. 2) of: in response to the management module of the motherboard of the server and the peripheral devices managed by the management module being powered with the use of the server power source and the power supply line of the USB ports being isolated, the firmware bootloader of the management module starts up in a mode in which it usually starts up, after the hardware chip is powered on, the hardware will directly run the firmware bootloader according to the chip circuit and the value of the fixed register, and normally the firmware bootloader is run from the address of 0x0.

Certainly, in the case that the server power source and the USB ports are supplying power simultaneously, if the server power source is selected to supply power, the firmware bootloader of the management module also uses its normal start up mode to start up.

Figure 3:
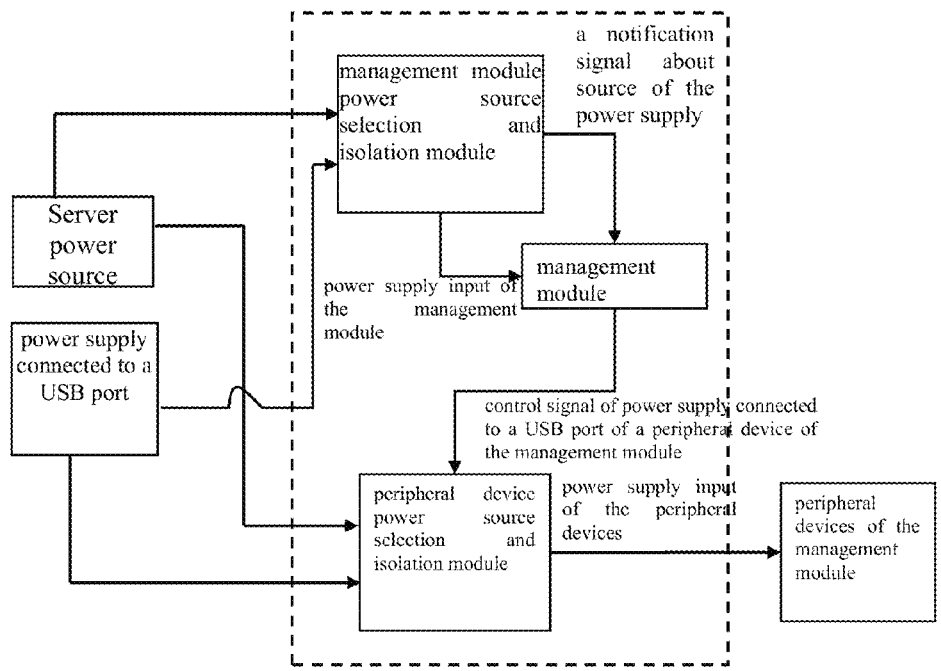
FIG. 3 schematically illustrates a structural block diagram of a power source selection and isolation system, according to one embodiment of the present invention.

Since there is a problem of power source selection and isolation when the USB ports and the server power source are supplying power, the power source selection and isolation should be implemented with the use of hardware circuit. Thus, in the same concept of the present invention, there is further disclosed a power source selection and isolation system, for power source selection and isolation in the case of supplying power to the management module in the motherboard of the server and the peripheral devices managed by the management module with the use of the server power source and the power supply connected to the USB port. The system is able to detect the power supply condition of the server power source and the power supply connected to the USB port, so as to select a suitable power source for supplying power, and notify the management module of where the power is obtained. Meanwhile, when the server power source is supplying power, no matter whether there is a power supply connected to the USB port, the system makes the management module to take power from the server power source. While the server power source is off and the power supply connected to the USB port exists, power is supplied from the USB port. And when one of these two power sources is supplying power, the other is isolated to prevent electric leakage. FIG. 3 schematically illustrates a structural block diagram of a power source selection and isolation system, according to one embodiment of the present invention. According to FIG. 3, the system includes:

a management module power source selection and isolation module configured to: take the output of the server power source and the power supply connected to the USB port as its input signal; in response to only the output of the server power source having a voltage or both the output of the server power source and the output of the power supply connected to the USB port having voltages, take the output of the server power source as its output to the power supply of the management module, and in response to only the output of the power supply connected to the USB port having a voltage, take the output of the power supply connected to the USB port as its output to the power supply input of the management module, and output a notification signal about source of the power supply for indicating which power supply the power supply input of the management module should use;

a management module configured to: receive a power supply input of the management module and a notification signal about source of the power supply, output from the management module power source selection and isolation module, and output a control signal of power supply connected to a USB port of the peripheral device of the management module for controlling the peripheral device whether to take power or not;

a peripheral device power source selection and isolation module configured to: take the output of the server power source, the output of the power supply connected to the USB port, and the control signal of the power supply connected to the USB port of the peripheral device output by the management module, as its input, in response to only the output of the server power source having a voltage or both the output of the server power source and the output of the power supply connected to the USB port having voltages, take the output of the server power source as its output to the power supply input of the peripheral device managed by the management module, and in response to only the output of the power supply connected to the USB port having a voltage, take the output of the power supply connected to the USB port as its output to the power supply input of the peripheral device managed by the management module, and controls the peripheral device to take power or not according to the control signal of the power supply connected to the USB port of the peripheral device of the management module.

Figure 4:
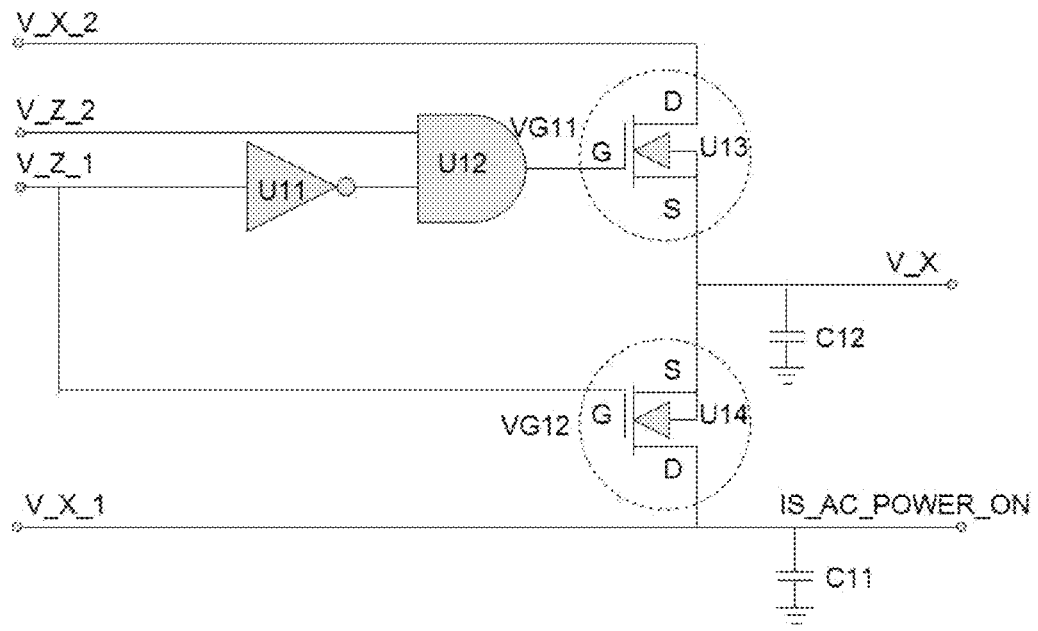
FIG. 4 schematically illustrates a circuit of a management module power source selection and isolation module, according to one embodiment of the present invention.

In one embodiment, FIG. 4 schematically illustrates a circuit of a management module power source selection and isolation module, according to one embodiment of the present invention, wherein input ends include V_Z_1, V_X_1, V_Z_2, and V_X_2, wherein V_Z_1 and V_X_1 are voltage outputs of the server power source, V_Z_2 and V_X_2 are voltage outputs of the power supply connected to the USB port. Output ends include V_X and IS_AC_POWER_ON, wherein V_X is a power supply voltage of the management module, IS_AC_POWER_ON is the notification signal about the source of the power supply for notifying it is the server power source or the power supply connected to the USB port supplying power currently. High level indicates it is the server power source supplying power currently, while low level indicates it is the power supply connected to the USB port supplying power currently. The module further includes:

A NOT gate U11, an AND gate U12, two N-channel metal oxide field effect transistors (NMOSFET) U13 and U14, and two capacitors C11 and C12, wherein V_Z_2 connects to one input end of U12, V_Z_1 connects to an input end of U11 and the gate (G) of U14, the output of U11 connects to the other input end of U12, the output of the U12 connects to the gate (G) of U13, V_X_1 connects to the drain (D) of U14, one end of C11 and IS_AC_POWER_ON, V_X_2 connects to the drain (D) of U13, one end of C12 connects to the sources (S) of U13 and U14 and V_X, the other end of C12 and C11 connect to the ground respectively.

The principle of the circuit shown in FIG. 4 is: first, assuming VG11 is the voltage of the gate (G) of U13, and VG12 is the voltage of the gate (G) of U14, then:

When V_X_1 is at high level (which means the server power source is supplying power), IS_AC_POWER_ON is also at high level, which indicates that it is the server power source which is supplying power. When V_Z_1 is at high level, VG12 is also at high level, and the voltage difference between VG12 and V_X_1 turns on the corresponding N-channel metal oxide field effect transistor (NMOSFET) U14, and enables V_X_1 to power the management module via V_X output by U14. Meanwhile, when V_Z_1 is at high level, VG11 is at low level with the action of NOT gate U11 and AND gate U12, and the corresponding NMOSFET U13 is turned off, and V_X_2 is isolated.

When V_X_1 is at low level (which means the server power source is off), IS_AC_POWER_ON is also at low level, which indicates the server power source is not supplying power. When V_Z_1 is at low level, VG12 is also at low level, and corresponding NMOSFET U14 is turned off, and V_X_1 is isolated. When V_Z_1 is at low level, and V_Z_2 is at high level (which means the power supply connected to the USB port is supplying power), VG11 is at high level with the action of NOT gate U11 and AND gate U12, and the voltage difference between VG11 and V_X_2 turns on the corresponding NMOSFET U13, and enables V_X_2 to power the management module via V_X output by U13. When V_Z_1 is at low level, and V_Z_2 is at low level (which means the power supply connected to the USB port is off), VG11 is at low level with the action of NOT gate U11 and AND gate U12, and the corresponding NMOSFET U13 is turned off, therefore the management module has no power.

Here, NMOSFET is used. In order to turn on the source (S) and the drain (D), and meet the voltage requirement of management module, the following formulas must be satisfied:

$$(VG11-V\_X\_2) > VGS(th)$$

$$(VG12-V\_X\_1) > VGS(th)$$

$$V\_X\_1 = V\_X + VDS$$

$$V\_X\_2 = V\_X + VDS$$

wherein VGS(th) is the threshold voltage of an NMOSFET. VDS is the voltage drop between the drain (D) and the source (S) after it is turned on. VG11 is the output voltage of V_Z_1 and V_Z_2 with the effects of NOT gate U11 and AND gate U12. VG12 equals to V_Z_1. V_X_2, V_X_1, V_Z_1, and V_Z_2 must be configured properly to satisfy the requirement of the working voltage of the management module and two NMOSFETs being not turned on simultaneously.

In one embodiment, the output control signal of the power supply connected to the USB port of the peripheral device of the management module includes USB_POWER_MODE signal and USB_POWER_PERMIT signal, wherein USB_POWER_MODE is used to indicate source of the power supply, and USB_POWER_PERMIT is used to control whether to permit the peripheral device to take power. When the management module detects that the notification signal about source of the power supply indicates the server power source is supplying power, USB_POWER_MODE will be set to low level, and at the same time USB_POWER_PERMIT will be set to low level. When the management module detects that the notification signal about source of the power supply indicates the power supply connected to the USB port is supplying power, USB_POWER_MODE will be set to high level, in this case, the management module chooses whether to allow the peripheral devices to take power by controlling the level of USB_POWER_PERMIT to be high or low.

Figure 5:
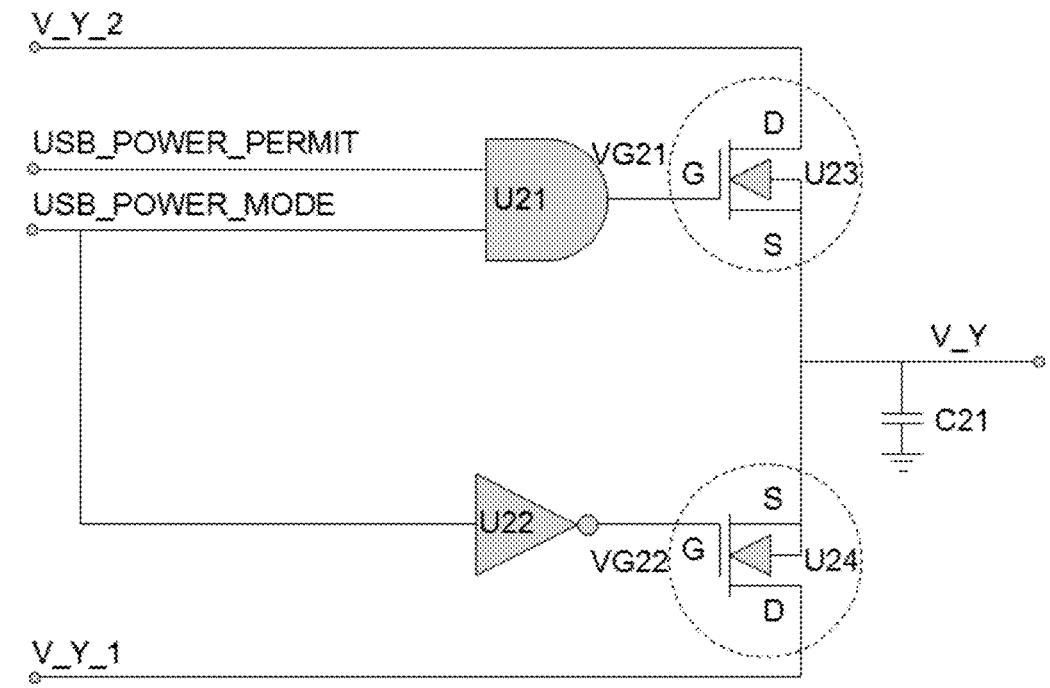
FIG. 5 schematically illustrates a circuit of a peripheral device power source selection and isolation module, according to one embodiment of the present invention.

In one embodiment, FIG. 5 schematically illustrates a circuit of a peripheral device power source selection and isolation module, according to one embodiment of the present invention, wherein input ends include V_Y_1, V_Y_2, and USB_POWER_MODE and USB_POWER_PERMIT signals, wherein V_Y_1 is the output voltage of the server power source, V_Y_2 is the output voltage of the power supply connected to the USB port, USB_POWER_MODE and USB_POWER_PERMIT are the control signals of the power supply connected to the USB port of the peripheral device of the management module output by the management module. The output V_Y is the working voltage of the peripheral devices. The module further includes: an AND gate U21, a NOT gate U22, N-channel metal oxide field effect transistors U23 and U24, and a capacitor C21, wherein the input signal USB_POWER_PERMIT is connected to one input end of U21, the input signal USB_POWER_MODE is connected to the other input end of U21 and the input end of U22, the output of U21 is connected to the gate (G) of U23, the output end of U22 is connected to the gate (G) of U24, the input end V_Y_1 is connected to the drain (D) of U24, the input end V_Y_2 is connected to the drain (D) of U23, source (S) of U23 and U24, and one end of capacitor C21 are connected to the output end V_Y, and the other end of C21 is connected to the ground.

The principle of the circuit shown in FIG. 5 is: assuming VG21 is the voltage of the gate (G) of U23, and VG22 is set to the voltage of the gate (G) of U24, then:

When USB_POWER_MODE is at low level (which means the server power source is supplying power), VG21 is at low level with the action of AND gate U21, the corresponding NMOSFET U23 is off, that is, V_Y_2 is isolated. Meanwhile, VG22 is at high level with the action of NOT gate U22, and the voltage difference between VG22 and V_Y_1 turns on the corresponding NMOSFET U24, and enables V_Y_1 to power the peripheral devices via the NMOSFET U24, that is, V_Y is output.

When USB_POWER_MODE is at high level (which means the power supply connected to the USB port is supplying power), VG22 is at low level with the action of NOT gate U22, the corresponding NMOSFET U24 is off, that is, V_Y_1 is isolated. Meanwhile, when the management module pulls up the USB_POWER_PERMIT, which indicates the management module allows peripheral devices to take power from the power supply connected to the USB port, that is peripheral devices can be powered on to operate; VG21 is at high level with the action of AND gate U21, and the corresponding NMOSFET U23 is on, and V_Y_2 powers the peripheral devices via the NMOSFET U23, that is, V_Y is output. Meanwhile, if the management module pulls down USB_POWER_PERMIT, which indicates the management module does not allow the peripheral device to take power from the power supply connected to the USB port, that is, peripheral devices can not be powered on to operate; VG21 is at low level with the action of AND gate U21, the corresponding NMOSFET U23 is off, and peripheral devices cannot take power.

Here, NMOSFET is used. In order to turn on the source (S) and the drain (D), and meet the voltage requirement of management module, the following formulas must be satisfied:

$$(VG21-V\_Y\_2) > VGS(th)$$

$$(VG22-V\_Y\_1) > VGS(th)$$

$$V\_Y\_1 = V\_Y + VDS$$

$$V\_Y\_2 = V\_Y + VDS$$

wherein VGS(th) is the threshold voltage of an N-channel metal oxide field effect transistor. VDS is the voltage drop between the drain (D) and the source (S) after it is turned on. VG21 is the output voltage of USB_POWER_PERMIT and USB_POWER_MODE after passing through AND gate U21. VG22 is the voltage of the USB_POWER_MODE after passing through NOT gate U22, USB_POWER_PERMIT, USB_POWER_MODE, V_Y_1, and V_Y_2 must be configured properly to enable V_Y to satisfy the requirement of the working voltage of the peripheral devices and to make two N-channel metal oxide field effect transistors not be turned on simultaneously.

Figure 6:
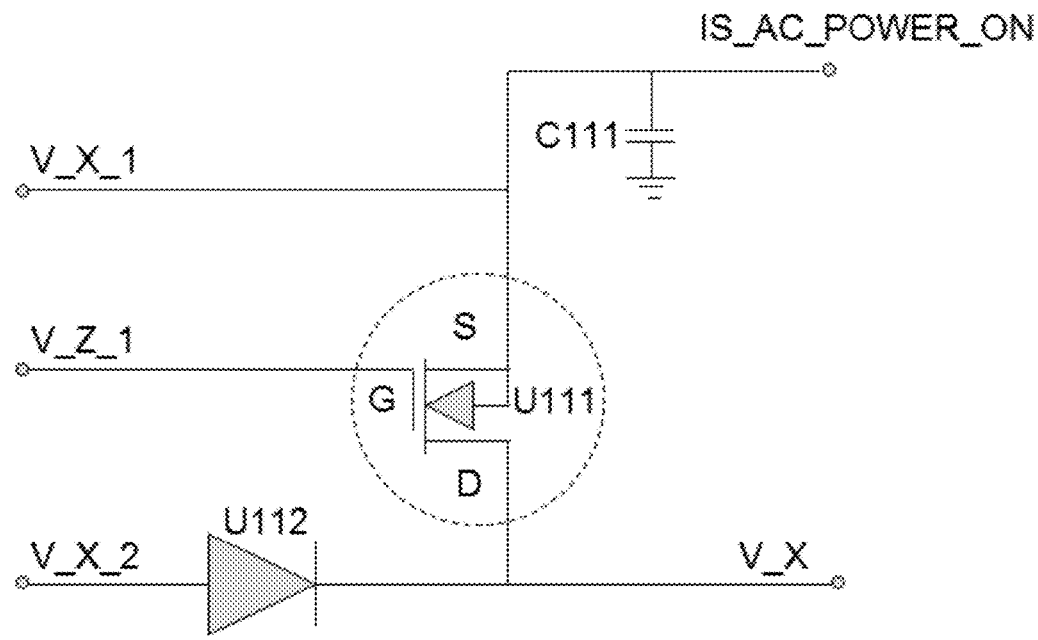
FIG. 6 schematically illustrates another circuit of a management module power source selection and isolation module, according to one embodiment of the present invention.
Figure 7:
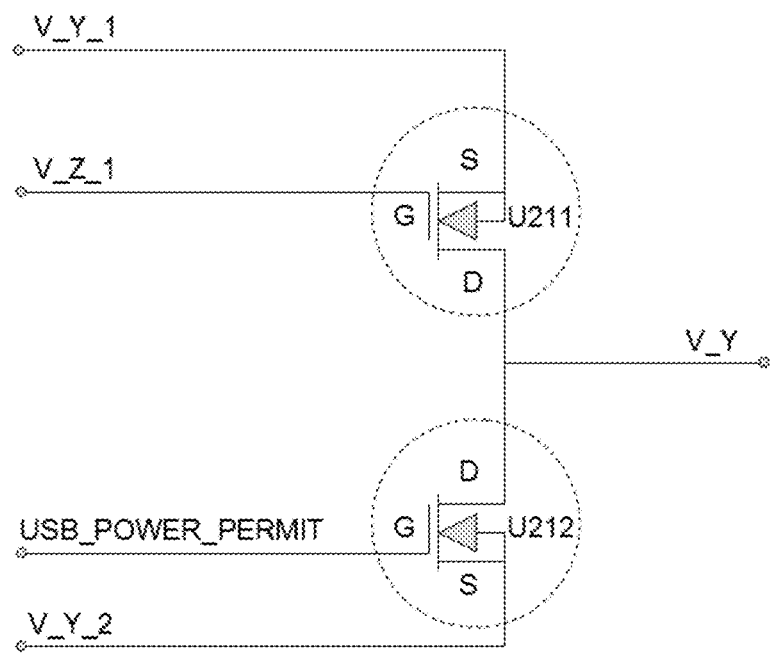
FIG. 7 schematically illustrates another circuit of a peripheral device power source selection and isolation module, according to one embodiment of the present invention.

In one embodiment, FIG. 6 schematically illustrates another circuit of a management module power source selection and isolation module, according to one embodiment of the present invention, FIG. 7 schematically illustrates another circuit of a peripheral device power source selection and isolation module, according to one embodiment of the present invention, wherein input ends include V_Z_1, V_X_1, and V_X_2, wherein V_Z_1 and V_X_1 are the voltage output of the server power source, V_X_2 is the output voltage of the power supply connected to the USB port, the output ends includes V_X and IS_AC_POWER_ON, wherein V_X is the power supply voltage of the management module, IS_AC_POWER_ON is the notification signal about source of the power supply, for notifying it is the server power source or the power supply connected to the USB port supplying power currently, the module further includes:

an N-channel metal oxide field effect transistor U111, a diode U112 and a capacitor C111, wherein, V_X_1 is connected to the source (S) of the U111, one end of the C111, and IS_AC_POWER_ON, the other end of the C111 is connected to the ground, V_Z_1 is connected to the gate (G) of the U111; V_X_2 is connected to the anode of U112, and the cathode of U112 is connected to the drain (D) of the U111 and V_X.

The principle of the circuit shown in FIG. 6 is as follows.

When the server power source is supplying power and the power supply connected to the USB port has no power, the voltage difference between V_Z_1 and V_X_1 turns on U111, V_X_1 powers the management module via U111, that is, V_X is output, and the management module takes power from the server power source. At this time, V_X_2=0, the diode is under reverse cutoff, so that isolation is achieved.

When the server power source is not supplying power and the power supply connected to the USB port has power, the voltage difference between V_Z_1 and V_X_1 is 0, which cannot turn on the U111, so that the server power source is isolated. The voltage of V_X_2 make the diode forward turned-on, and V_X_2 powers the management module via U112, that is, V_X is output, and the management module takes power from the power supply connected to the USB port. IS_AC_POWER_ON being at high level means it is the server power source supplying power currently; IS_AC_POWER_ON being at low level means it is the power supply connected to the USB port supplying power currently.

In one embodiment, the output control signal of the power supply connected to the USB port of the peripheral device of the management module include USB_POWER_PERMIT signal. The management module chooses whether to allow peripheral devices to take power by controlling the level of USB_POWER_PERMIT to be high or low.

In one embodiment, FIG. 7 schematically illustrates a circuit of a peripheral device power source selection and isolation module, according to one embodiment of the present invention, wherein the input ends include V_Y_1, V_Z_1, V_Y_2, and USB_POWER_PERMIT, wherein V_Y_1 and V_Z_1 are the output voltage of the server power source, V_Y_2 is the output voltage of the power supply connected to the USB port, USB_POWER_PERMIT is the control signal of the power supply connected to the USB port of the peripheral device of the management module output by the management module. The output V_Y is the working voltage of the peripheral devices. The circuit of the module further includes: N-channel metal oxide field effect transistors U211 and U212, in which, the input end V_Y_1 is connected to the source (S) of the U211, the input end V_Z_1 is connected to the gate (G) of the U211, the input end USB_POWER_PERMIT is connected to the gate (G) of the U212, the V_Y_2 is connected to the source (S) of the U212, the drain (D) of the U211 and the drain (D) of the U212 is connected to the output end of V_Y.

The principle of the circuit shown in FIG. 7 is as follows.

When the server power source is supplying power, the voltage difference between V_Y_1 and V_Z_1 turns on U211, the voltage difference between USB_POWER_PERMIT and V_Y_2 cuts off U212, so that the power from the server power source is directed to V_Y and the power supply connected to the USB port is isolated.

When the power supply connected to the USB port is supplying power, the voltage difference between V_Y_1 and V_Z_1 turns off U211, therefore the server power source is isolated. The management module controls the voltage on USB_POWER_PERMIT to control the on or off of the U212. When the voltage difference between USB_POWER_PERMIT and V_Y_2 satisfies the conduct threshold voltage of the U212, U212 is on, and the power from the power supply connected to the USB port is directed to V_Y, that is, the peripheral device takes power from the USB power. When the voltage difference between USB_POWER_PERMIT and V_Y_2 do not satisfy the conduct threshold voltage of the U212, U212 is cut off, that is, the peripheral device cannot take power from the USB power.

As will be appreciated by one skilled in the art, the circuits shown in FIG. 4 to FIG. 7 can be on the motherboard of the server, and also can be in the server power source, and even can be in a separate circuit board that has connection relationship with the motherboard of the server and the power source.

Figure 8:
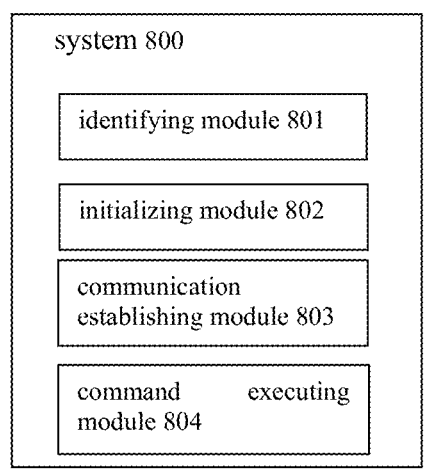
FIG. 8 illustrates a structural block diagram of a server motherboard diagnose system, according to one embodiment of the present invention.

Another aspect of the present invention comprises a server motherboard diagnosis system, one example embodiment of which is shown in FIG. 8. FIG. 8 discloses a server motherboard diagnosis system 800, a management module of the server motherboard and peripheral devices managed by the management module capable of being powered by a server power source and a USB port, wherein in response to the management module of the server motherboard and the peripheral devices managed by the management module being powered by the USB port, a power supply line of the server power source is isolated. FIG. 8 illustrates the structural block diagram of the system 800. According to FIG. 8, the system includes: an identifying module 801 configured to identify the peripheral devices managed by the management module in response to the management module of the server motherboard and the peripheral devices managed by the management module being powered by the USB port; an initializing module 802 configured to, for each of the identified peripheral devices managed by the management module, initialize the peripheral device, and then shut down the power supply of the peripheral device; a communication establishing module 803 configured to establish a communication between the management module and the diagnosis host through the USB port; and a command executing module 804, configured to execute a command in response to the command being received from the diagnosis host.

In one embodiment, the identifying module 801, the initiating module 802, and the communication establishing module 803 are all included in a firmware bootloader module of the management module.

In one embodiment, the command executing module 804 is further configured to: in response to a command received from the diagnosis host being to start a firmware of the management module, cause a firmware bootloader module to load the firmware of the management module, and then control only the power supply of the peripheral devices managed by the management module, and transfer other control to the firmware of the management module.

In one embodiment, the command executing module 804 is further configured to: in response to a command received from the diagnosis host being to start a firmware of the management module, cause the firmware bootloader module to load the firmware of the management module, and then transfer control to the firmware of the management module and exit.

In one embodiment, the command executing module 804 is further configured to: in response to receiving from the diagnosis host a command related to other peripheral devices of the management module, the other peripheral devices being not a memory where the firmware of the management module resides, the firmware of the management module carries out the following operations of: first, instructing the firmware bootloader to turn on the power supply of a peripheral device corresponding to the command; then sending the command to the peripheral device; at last, instructing the firmware bootloader module to turn off the power supply of the peripheral device corresponding to the command, in response to the completion of the execution of the command.

In one embodiment, the command executing module 804 is further configured to: in response to receiving from the diagnosis host a command related to other peripheral devices of the management module, the other peripheral devices being not a memory where the firmware of the management module resides, the firmware of the management module carries out the following operations of: firstly, turning on a power supply of a peripheral device corresponding to the command; then sending the command to the peripheral device; at last, turning off the power supply of the peripheral device corresponding to the command, in response to the completion of the execution of the command.

In one embodiment, the system further includes: a determination module (not shown in FIG. 8), configured to determine whether the management module of the server motherboard and peripheral devices managed by the management module are powered by the server power source or the power supply connected to the USB port.

In one embodiment, the initialization module 802 is further configured to: in response to there being a plurality of peripheral devices managed by the management module being identified, after initializing one of the identified peripheral devices, shut down the power supply of the peripheral device, and then initialize a next identified peripheral device.

As will be appreciated by one skilled in the art, with realizing respective steps of the method in the present invention by way of software, hardware or a combination of both, it is possible to provide a server motherboard diagnosis method or system. Even if the hardware structure of the system is as the same as a general purpose apparatus, the system has different characteristics from the general purpose apparatus, due to the software included, so as to form modules of respective embodiment of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for diagnosis of a server motherboard, there being a management module of the server motherboard and peripheral devices managed by the management module capable of being powered by a server power source and a USB port, wherein in response to the management module of the server motherboard and the peripheral devices managed by the management module being powered by the USB port, a power supply line of the server power source is isolated, the system comprising:

hardware, including a processor and memory;
an identifying module implemented at least by the hardware and configured to identify the peripheral devices managed by the management module, in response to the management module of the server motherboard and the peripheral devices managed by the management module being powered by the USB port;
an initializing module implemented at least by the hardware and configured to, for each of the identified peripheral devices managed by the management module, initializing the peripheral device, and then shutting down the power supply of the peripheral device;
a communication establishing module implemented at least by the hardware and configured to establish a communication between the management module and a diagnosis host through the USB port; and
a command executing module implemented at least by the hardware and configured to execute a command in response to the command being received from the diagnosis host.

2. The system of claim 1, wherein the identifying module, the initializing module, and the communication establishing module are included in a firmware bootloader of the management module.

3. The system of claim 2, wherein the command executing module is further configured to:
in response to a command received from the diagnosis host being to start a firmware of the management module, cause a firmware bootloader module to load the firmware of the management module, and then control only the power supply of the peripheral devices managed by the management module, and transfer other control to the firmware of the management module.

4. The system of claim 2, wherein the command executing module is further configured to:
in response to a command received from the diagnosis host being to start a firmware of the management module, cause the firmware bootloader module to load the firmware of the management module, and then transfer control to the firmware of the management module and exit.

5. The system of claim 3, wherein the command executing module is further configured to:
in response to receiving from the diagnosis host a command related to other peripheral devices of the management module, the other peripheral devices being not a memory where the firmware of the management module resides, the firmware of the management module carries out the following operations of:
instructing the firmware bootloader module to turn on the power supply of a peripheral device corresponding to the command;
sending the command to the peripheral device;
instructing the firmware bootloader module to turn off the power supply of the peripheral device corresponding to the command, in response to the completion of the execution of the command.

6. The system of claim 4, wherein the command executing module is further configured to:
in response to receiving from the diagnosis host a command related to other peripheral devices of the management module, the other peripheral devices being not a memory where the firmware of the management module resides, the firmware of the management module carries out the following operations of:
turning on a power supply of a peripheral device corresponding to the command;
sending the command to the peripheral device;
turning off the power supply of the peripheral device corresponding to the command, in response to the completion of the execution of the command.

7. The system of claim 5, the system further includes:
a determining module implemented at least by the hardware, configured to determine whether the management module of the server motherboard and peripheral devices managed by the management module are powered by the server power source or by the USB port.

8. The system of claim 5, wherein the initializing module is further configured to:
in response to there being a plurality of peripheral devices managed by the management module being identified, after initializing one of the identified peripheral devices, shut down the power supply of the peripheral device, and then initialize a next identified peripheral device.

9. A power source selection and isolation system, for selecting and isolating a power source in the case of a management module of a server and peripheral devices managed by the management module being powered by a server power source and a USB port, the system comprising:
hardware, including a processor and memory;
a management module power source selection and isolation module implemented at least by the hardware, configured to: take the output of the server power source and the output of the power supply connected to the USB port as its input signal, in response to the output of the server power source having a voltage, take the output of the server power source as its output to the power supply input of the management module, and in response to only the output of the power supply connected to the USB port having a voltage, take the output of the power supply connected to the USB port as its output to the power supply input of the management module, and output a notification signal about source of the power supply for indicating which power supply the power supply input of the management module should use;
a management module implemented at least by the hardware, configured to: receive a power supply input of the management module and a notification signal about source of the power supply output from the management module power source selection and isolation module, output a control signal of power supply connected to a USB port of a peripheral device of the management module, for controlling the peripheral device to take power or not;
a peripheral device power source selection and isolation module implemented at least by the hardware, configured to: take the output of the server power source, the output of the power supply connected to the USB port, and the control signal of the power supply connected to the USB port of the peripheral device output by the management module as its input, in response to only the output of the server power source having a voltage or both the output of the server power source and the output of the power supply connected to the USB port having voltages, take the output of the server power source as its output to the power supply input of the peripheral device managed by the management module, and in response to only the output of the power supply connected to the USB port having a voltage, take the output of the power supply connected to the USB port as its output to the power supply input of the peripheral device managed by the management module, and control the peripheral device to take power or not according to the control signal of the power supply connected to the USB port of the peripheral device of the management module.

10. The system of claim 9, wherein in the management module power source selection and isolation module, input ends include V_Z_1, V_X_1, V_Z_2, and V_X_2, wherein V_Z_1 and V_X_1 are voltage outputs of the server power source, V_Z_2 and V_X_2 are voltage outputs of the power supply connected to the USB port, output ends include V_X and IS_AC_POWER_ON, wherein V_X is a power supply voltage of the management module, IS_AC_POWER_ON is the notification signal about the source of the power supply, the module further includes:

a NOT gate U11, an AND gate U12, two N-channel metal oxide field effect transistors U13 and U14, and two capacitors C11 and C12, wherein V_Z_2 connects to one input end of U12, V_Z_1 connects to an input end of U11 and the gate (G) of U14, the output of U11 connects to the other input end of U12, the output of the U12 connects to the gate (G) of U13, V_X_1 connects to the drain (D) of U14, one end of C11 and IS_AC_POWER_ON, V_X_2 connects to the drain (D) of U13, one end of C12 connects to the sources (S) of U13 and U14 and V_X, the other end of C12 and C11 connect to the ground respectively.

11. The system of claim 10, wherein the control signal of the power supply connected to the USB port of the peripheral devices of the management module include a USB_POWER_MODE signal and a USB_POWER_PERMIT signal, wherein USB_POWER_MODE is used to indicate the source of the power supply, and USB_POWER_PERMIT is used to control whether to permit the peripheral device to take power; and in the peripheral device power source selection and isolation module, input ends include V_Y_1, V_Y_2, USB_POWER_MODE, and USB_POWER_PERMIT, wherein V_Y_1 is the output voltage of the server power source, V_Y_2 is the output voltage of the power supply connected to the USB port, output V_Y is the working voltage of the peripheral device, the peripheral device power source selection and isolation module further includes: an AND gate U21, a NOT gate U22, N-channel metal oxide field effect transistors U23 and U24, and a capacitor C21, wherein the input signal USB_POWER_PERMIT is connected to one input end of U21, the input signal USB_POWER_MODE is connected to the other input end of U21 and the input end of U22, the output of U21 is connected to the gate (G) of U23, the output end of U22 is connected to the gate (G) of U24, the input end V_Y_2 is connected to the drain (D) of U23, the input end V_Y_1 is connected to the drain (D) of U24, sources (S) of U23 and U24, and one end of capacitor C21 are connected to the output end V_Y, and the other end of C21 is connected to the ground.

12. The system of claim 9, wherein in the management module power source selection and isolation module, input ends include V_Z_1, V_X_1, and V_X_2 wherein V_Z_1 and V_X_1 are the voltage output of the server power source, V_X_2 is the output voltage of the power supply connected to the USB port, the output ends includes V_X and IS_AC_POWER_ON, wherein V_X is the power supply voltage of the management module, IS_AC_POWER_ON is the notification signal about source of the power supply, for notifying whether the server power source or the power supply connected to the USB port is supplying power currently, the module further includes:

an N-channel metal oxide field effect transistor U111, a diode U112 and a capacitor C111, wherein, V_X_1 is connected to the source (S) of the U111, one end of the C111, and IS_AC_POWER_ON, the other end of the C111 is connected to the ground, V_Z_1 is connected to the gate (G) of the U111; V_X_2 is connected to the anode of U112, the cathode of U112 is connected to the drain (D) of the U111 and V_X.

13. The system of claim 12, the control signal of the power supply connected to the USB port of the peripheral device of the management module includes USB_POWER_PERMIT signal, used to control whether to permit the peripheral device to take power; and wherein in the peripheral device power source selection and isolation module, the input ends include V_Y_1, V_Z_1, V_Y_2, and USB_POWER_PERMIT, wherein V_Y_1 and V_Z_1 are the output voltage of the server power source, V_Y_2 is the output voltage of the power supply connected to the USB port, output V_Y is the working voltage of the peripheral device, the module further includes: N-channel metal oxide field effect transistors U211 and U212, wherein, V_Y_1 is connected to the source (S) of the U211, V_Z_1 is connected to the gate (G) of the U211, USB_POWER_PERMIT is connected to the gate (G) of the U212, the V_Y_2 is connected to the source (S) of the U212, the drain (D) of the U211 and the drain (D) of the U212 is connected to V_Y.

* * * * *